United States Patent Office 3,435,014
Patented Mar. 25, 1969

3,435,014
POLYMERIZATION PROCESS
Gerhard Wolfgang Helmut Scherf and John Frederick Henderson, Sarnia, Ontario, Canada, assignors to Polymer Corporation Limited, Sarnia, Ontario, Canada, a body corporate and politic of Canada
No Drawing. Filed Sept. 14, 1964, Ser. No. 396,419
Claims priority, application Canada, Sept. 20, 1963, 884,970
Int. Cl. C08g 23/06; C08f 15/18
U.S. Cl. 260—89.5                                       19 Claims

ABSTRACT OF THE DISCLOSURE

Vulcanizable acrylic/saturated epoxy copolymers containing ether linkages in its backbone, prepared in the presence of a catalyst comprising an organometallic compound of a metal selected from Groups II and III of the Periodic Classification of the Elements, said organometallic compound having at least one organic radical linked to the metal atom through a carbon atom.

---

The present invention relates to a process for the preparation of valuble polymeric materials and to several novel polymeric products which can be prepared by this process.

The polymerization of unsaturated esters such as acrylates and methacrylates through their olefinic double bonds is well-known. The polymerzation of compounds containing epoxy groups by ring-opening of these groups to give polymers containing ether linkages in their backbones is also known. We have now surprisingly found that valuable polymeric materials can be prepared by copolymerizing certain unsaturated esters with saturated epoxy compounds in the presence of certain organo-metallic catalysts.

The process of the present invention comprises copolymerizing (a) at least one acrylic-type monomer corresponding to the formula:

RCH=CR′COOR″ in which R and R′ are the same as or different from each other and each represents a hydrogen atom or an alkyl group having one to four carbon atoms and R″ represents an aliphatic group containing from one to eight carbon atoms and (b) at least one saturated epoxy monomer, in the presence of a catalyst comprising an organo-metallic compound of a metal of Group II or III of the Perodic Classification of the Eelements to give a copolymer containing ether linkages in its backbone.

The preferred acrylic-type monomers which may be used to prepare copolymers in accordance with the present invention are those corresponding to the above formula in which R and R′ are the same as or different from each other and each represents a hydrogen atom or an alkyl group having one or two carbon atoms and in which R″ represents an aliphatic group having one to four carbon atoms. The most preferred acrylic-type monomers are alkyl acrylates in which the alkyl groups contain from one to four carbon atoms. An example of such a preferred monomer is ethyl acrylate.

The copolymers of the present invention may be prepared from a wide range of saturated epoxy monomers but it is preferred to use those which correspond to the general formula:

in which M represents a hydrogen atom, an unsubstituted or halogenated alkyl group having from one to eight carbon atoms or an unsubstituted or halogenated aryl group.

Although numerous combinations of the various monomers may be used to form valuable copolymers in accordance with the present invention, the following combinations are given as being illustrative of the present invention:

(a) Ethyl acrylate and ethylene oxide,
(b) Ethyl acrylate and propylene oxide,
(c) Ethyl acrylate and epichlorohydrin,
(d) Ethyl acrylate, ethylene oxide and propylene oxide,
(e) Ethyl acrylate, ethylene oxide and epchlorohydrin.
(f) Ethyl acrylate, propylene oxide and epichlorohydrin, and
(g) Ethyl acrylate, ethylene oxide, propylene oxide and epichlorohydrin.

It will be appreciated that other acrylic-type monomers, such as butyl acrylate, within the above general definition may be used together with or instead of ethyl acrylate in the preferred process of the present invention.

The relative proportions of the different monomers may be varied widely in order to provide polymers having a wide range of properties and the resulting products, which are also embraced by the present invention, will have a wide range of applications which will be dictated by the natures of and the relative proportions of the monomer units which they contain. The products of the process of the present invention range from sticky relatively low molecular weight copolymers through rubbery materials to hard plastic products. Many of these materials will find important applications due to their unusual combinations of properties. The products may, for instance, find application in gaskets, O-rings, etc.

As previously stated, the copolymerization of the present invention is effected in the presence of a catalyst comprising an organo-metallic compound of a metal of Group II or III of the Periodic Classification of the Elements, for example, in the presence of organo-metallic compounds of aluminum, zinc, magnesium, cadmium and boron. Although the preferred catalyst differs for different monomer combinations, it has been found that, in general, satisfactory results are obtained using organo-metallarly satisfactory results have been obtained with zinc dialkyls having from one to four carbon atoms in their alkyl group, and with organo-aluminum compounds corre- lic compounds in which at least one organic radical is linked to the metal atom through a carbon atom. Particusponding to the general formula:

in which R represents an alkyl group having from one to four carbon atoms and $n$ is 1, 2 or 3. When aluminum and zinc alkyls are used, it is generally also useful to use a proton-donating cocatalyst such as water or an alcohol, such as low molecular weight alcohols having one to six carbon atoms. The cocatalyst is generally used in such an amount that the total number of active hydrogen atoms in the cocatalyst does not exceed the total number of alkyl groups attached to the metal atoms in the catalyst. It is generally preferred to use an even smaller amount. The catalysts and cocatalysts are only used in catalytic amounts and satisfactory results have been obtained using amounts as low as 0.2 mole percent.

It has, for instance, been found that ethyl acrylate and epichlorohydrin may effectively be copolymerized using combinations of aluminum triethyl and water or of aluminum triethyl and alumina. In the copolymerization of ethyl acrylate and ethylene oxide, most satisfactory results have been obtained using the following catalyst systems:

(A) Aluminum triethyl and water,
(B) Aluminum triethyl and polyvinyl alcohol,
(C) Aluminum triethyl, zinc diethyl and water, (D) Aluminum triethyl, zinc diethyl and ethyl alcohol,
(E) Aluminum triethyl, zinc diisobutyl and water,
(F) Ethyl aluminum dichloride, zinc diethyl and water, and
(G) Aluminum triisobutyl, zinc diethyl and water.

For the copolymerization of ethyl acrylate and propylene oxide, most satisfactory results have been obtained using aluminum triethyl together with an alcohol, such as tertiary butyl alcohol or polyvinyl alcohol.

The copolymerization of the present invention may be carried out in bulk but a more efficient reaction providing a product in a more convenient form is obtained by effecting the polymerization with the monomers in solution in a liquid unsubstituted or substituted hydrocarbon, particularly in an aromatic hydrocarbon such as benzene or in a chlorinated hydrocarbon such as methylene chloride or chlorobenzene, which is inert with respect to both the monomers and the catalyst system and in which the product is soluble. Satisfactory copolymerizations have also been effected in solution in saturated aliphatic hydrocarbons, but, in such solvents, the product may partially precipitate. If desired, mixed solvents may be used. The copolymerization may be carried out at any desired temperature although, in general, a range of 0° C. to 150° C. is used. It is preferred to operate in a range from 30° C. to 120° C. The particular temperature which is preferred will be determined by the particular catalyst system and the relative reactivities of the monomer and can be readily determined by experimentation.

Many of the polymeric products of the process of the invention are novel copolymers and these novel polymeric products are defined as comprising copolymers of at least one saturated epoxy compound with at least one acrylic-type monomer which corresponds to the formula:

$$RCH{=}CR'COOR''$$

in which R and R' represent a hydrogen atom or an alkyl group having from one to four carbon atoms, and R'' represents a saturated or unsaturated aliphatic group having from one to eight carbon atoms when R' represents a hydrogen atom, and R'' represents an unsaturated aliphatic group having from one to eight carbon atoms when R' represents an alkyl group having from one to four carbon atoms. Particularly valuable novel polymeric materials are the copolymers of at least one alkyl acrylate having from one to four carbon atoms in its alkyl group with at least one saturated epoxy monomer which corresponds to the general formula:

in which M represents a hydrogen atom, an unsubstituted or halogenated alkyl group having from one to eight carbon atoms or an unsubstituted or halogenated aryl group. Examples of such preferred novel products are those comprising copolymers of ethyl acrylate with at least one saturated epoxy monomer selected from ethylene oxide, epichlorohydrin and propylene oxide.

The novel copolymers of saturated halogenated epoxy compounds with acrylic-type monomers, such as the copolymers of ethyl acrylate and epichlorohydrin, have the advantage of being capable of being cross-linked using a zinc oxide/amine vulcanization system to give valuable elastomeric products. It has also surprisingly been found that the novel copolymers of ethyl acrylate and ethylene oxide can be vulcanized using a zinc oxide/amine vulcanization system. These vulcanized products are within the scope of the present invention.

The preparation of copolymers in accordance with the present invention and their vulcanization will now be described in the following examples.

EXAMPLE 1

Into a dry 200 cc. glass bottle, there were introduced 50 ml. of ethyl acrylate and 2.5 ml. of epichlorohydrin which had previously been purified by distillation after the addition of a small amount of calcium hydride to remove all traces of water. The amounts of the monomers which were used correspond to a molar proportion of 93.5% ethyl acrylate and 6.5% epichlorohydrin.

Three grams of anhydrous alumina were added and the bottle was then closed with a rubber stopper. The catalyst, 0.57 g., corresponding to 5 mmoles, of aluminum triethyl was next injected into the bottle, which was then shaken a few times and then sealed with a rubber-lined metal cap using a Teflon gasket to prevent contact between the rubber lining and the contents of the bottle. The bottle and its contents were then maintained at a temperature of 60° C. for 38 hours, afer which time the contents of the bottle were transferred to aluminum trays and mixed with a few drops of water to destroy the catalyst. The alumina cocatalyst was not removed from the product. The unreacted monomers were then evaporated off and the product was dried at 50–60° C. to constant weight. There were finally obtained 22.6 g. of a rubbery polymeric product. This weight of product corresponds to a conversion of 46% by weight.

The product was then compounded on an open-roll mill at 112° C. in the following recipe, all parts being by weight:

| | Parts |
|---|---|
| Polymer | 100 |
| HAF black | 40 |
| Zinc oxide | 5 |
| Triethylene tetramine | 2.5 |

The compound stock was then vulcanized at 370° F. for the times indicated to give a vulcanized stock having the following physical properties:

| | Cure Time (minutes) | | |
|---|---|---|---|
| | 20 | 40 | 80 |
| Tensile strength (p.s.i.) | 960 | 1,550 | 1,960 |
| Elongation at break (percent) | 1,150 | 850 | 700 |
| Modulus at 300% elongation (p.s.i.) | 375 | 550 | 740 |

Since polyethyl acrylate would not vulcanize when compounded and treated in the same manner, this example indicates that the epichlorohydrin was incorporated into the polymer chain.

The above copolymerization was repeated but 25 ml. of benzene, 25 ml. of ethyl acrylate and 1.25 ml. of epichlorohydrin were used with the same amounts of catalyst and cocatalyst. There were finally obtained 9.6 g. of a tough rubbery copolymer. This weight of copolymer corresponds to a conversion of 39% by weight.

The chlorine content of the product was then determined and found to be 1.70% by weight, whereas a calculation based on the monomer feed gives an expected value of 1.71%.

Example 2

Into a dry 200 cc. glass bottle, there were introduced 75 ml. of benzene, 45 ml. of ethyl acrylate and 30 ml. of epichlorohydrin which had been dried and purified in the manner described in Example 1. The amounts of the monomers which were used correspond to a molar proportion of 52% ethyl acrylate and 48% epichlorohydrin.

The bottle was then closed with a rubber stopper and 0.135 g. of water and 0.855 g. of aluminum triethyl were injected into the monomer solution, after which the bottle was sealed and the polymerization and product separation were effected in the manner described in Example 1 except that the polymerization was carried out for 44 hours at 60° C. There were finally obtained 6.2 g. of a rubbery product corresponding to a conversion of 8% by weight.

In order to determine the composition of the product, 0.59 g. thereof, was shaken for 12 hours at room temperature in 20 ml. of acetone. The solubility of the product in acetone was 19% by weight and characteristic absorption bands of both ethyl acrylate and epichlorohydrin were found in both the soluble and insoluble fractions by infra-red examination. Since homopolymers of epichlorohydrin are much more soluble in acetone than are homopolymers of ethyl acrylate, this result shows that the product comprised a true copolymer. A similar result was obtained when the product was fractionated with benzene.

Example 3

A copolymer was prepared as generally described in Example 1 using 50 ml. of benzene, 20 ml. of ethyl acrylate and 5 ml. of ethylene oxide, which had been dried and purified as in Example 1. The cocatalyst, 80 mg., corresponding to 1.8 mmole of Elvanol, Grade 71-24, polyvinyl alcohol was then added to the monomer solution and the bottle was closed with a rubber stopper. The catalyst, 0.285 g., corresponding to 2.5 mmole, of aluminum triethyl was next injected into the bottle and the latter was then sealed and the polymerization and product separation carried out as described in Example 1 except that the polymerization was continued for 40 hours at 60° C. The amounts of the monomers which were used correspond to a molar proportion of 64.8% ethyl acrylate and 35.2% ethylene oxide.

There were finally obtained 8.7 g. of a tough rubbery product having a crystallinity of 10% as determined by X-ray diffraction. This yield of product corresponds to a conversion of 38% by weight.

The polymeric product was then compounded on an open-roll mill in the following recipe, all parts being by weight:

| | Parts |
|---|---|
| Polymer | 100 |
| HAF black | 40 |
| Zinc oxide | 5 |
| Triethyl tetramine | 1.5 |

The compounded stock was then vulcanized for 80 minutes at 325° F. and the vulcanized stock had the following physical properties:

| | |
|---|---|
| Tensile strength p.s.i. | 1560 |
| Elongation at break percent | 680 |
| Modulus at 300% elongation p.s.i. | 650 |

Since neither ethyl acrylate homopolymers nor ethylene oxide homopolymers can be vulcanized when compounded in this recipe, the vulcanizability of the product is considered to indicate the formation of a copolymer.

Example 4

A copolymer of 30 ml. of ethyl acrylate and 20 ml. of ethylene oxide was prepared in the general manner described in Example 2 except that 100 ml. of benzene were used, and 0.90 g. of water and 0.57 g. of aluminum triethyl were used as the catalyst system. The amounts of the monomers which were used correspond to a molar proportion of 40.8% ethyl acrylate and 59.2% ethylene oxide.

After 40 hours at 60° C., there were finally obtained 14.1 g. of a tough plastic product corresponding to a conversion of 31% by weight.

Since ethylene oxide and its homopolymers are known to be soluble in water, it is possible to determine whether copolymerization has occurred by infra-red examination of the fractions of the product which are soluble and insoluble in water. It was found that the product was soluble to the extent of 62% in water, and infra-red examination of this soluble fraction showed absorption bands characteristic of both ethylene oxide and ethyl acrylate. Furthermore, infra-red examination of the water-insoluble fraction showed the presence of absorption bands for both monomer units. These results indicate the formation of a copolymer.

Example 5

Further copolymerization for 44 hours at 60° C. of certain acrylic-type monomers with ethylene oxide were carried out in the general manner described in Example 2 in accordance with the details given in Table I.

TABLE I

| Acrylic-type Monomer | | Ethylene Oxide, ml. | Molar Ratio Acrylate/ Ethylene Oxide | Solvent | | Catalyst (1) | | Catalyst (2) | | Co-catalyst | | Product Appearance | Yield (g.) |
|---|---|---|---|---|---|---|---|---|---|---|---|---|---|
| Identity | (Ml.) | | | Identity | (Ml.) | Type[1] | m-Mole | Type[1] | m-Mole | Identity | m-Mole | | |
| Ethyl acrylate | 30 | 17 | 44.7/55.3 | Methylene chloride | 50 | AlEtCl₂ | 2.5 | ZnEt₂ | 0.65 | H₂O | 2.5 | Tough opaque rubber | 11.1 |
| Do | 30 | 17 | 44.7/55.3 | do | 50 | AlEtCl₂ | 2.5 | ZnEt₂ | 2.5 | H₂O | 2.5 | do | 25.3 |
| Do | 30 | 17 | 44.7/55.3 | Benzene | 50 | AlEt₃ | 0.65 | ZnEt₂ | 2.5 | H₂O | 2.5 | Tacky white rubber | 17.6 |
| Do | 30 | 17 | 44.7/55.3 | Methylene chloride | 50 | AlEt₃ | 0.65 | ZnEt₂ | 1.9 | EtOH | 1.9 | Tough yellow rubber | 12.4 |
| Do | 30 | 17 | 44.7/55.3 | Benzene | 50 | AlEt₃ | 2.5 | ZnEt₂ | 0.2 | H₂O | 2.5 | Tacky white rubber | 27.0 |
| Do | 30 | 17 | 44.7/55.3 | Methylene chloride | 50 | Al(iBu)₃ | 2.5 | Zn(iBu)₂ | 0.65 | H₂O | 2.5 | Hard white material | 25.7 |
| Allyl methacrylate | 10 | 5 | 41.3/58.7 | Benzene | 20 | AlEt₃ | 1.3 | ZnEt₂ | | H₂O | 1.1 | Hard plastic | 1.5 |
| n-Butyl acrylate | 40 | 20 | 41.1/58.9 | do | 60 | AlEt₃ | 2.5 | | | | | Tacky rubber | 16.4 |
| Ethyl acrylate | 30 | 17 | 44.7/55.3 | Chlorobenzene | 50 | AlEt₃ | 2.5 | ZnEt₂ | 0.65 | H₂O | 2.5 | Tough solid rubber | 27.0 |

[1] Et=Ethyl; iBu=Isobutyl.

Example 6

A copolymer of 18.9 ml. of ethyl acrylate and 5 ml. of propylene oxide was prepared in the general manner described in Example 2 except that 75 ml. of benzene was used and 1.75 mmole of allyl alcohol and 2.5 mmole of aluminum triethyl were used as the catalyst system. The amounts of the monomers which were used correspond to a molar proportion of 68.6% ethyl acrylate and 31.4% propylene oxide.

After 44 hours at 60° C., there were finally obtained 2.8 g., of a rubber product which containsd 67% by weight of ethyl acrylate units. This yield corresponds to a conversion of 13% by weight.

We claim:

1. A copolymer prepared by copolymerizing a monomeric mixture consisting of (a) at least one saturated epoxy compound having the formula $$MCH\underset{O}{\diagdown\diagup}CH_2$$

in which M is selected from the class consisting of a hydrogen atom, unsubstituted alkyl groups having from one to eight carbon atoms, halogenated alkyl groups having from one to eight carbon atoms, unsubstituted aryl groups, and halogenated aryl groups, and (b) at least one acrylic-type monomer having the formula

RCH=CR'COOR'' in which R and R' are each selected from the class consisting of a hydrogen atom and alkyl groups having from one to four carbon atoms, and R'' is selected from the class consisting of saturated and unsaturated aliphatic groups having from one to eight carbon atoms when R' represents a hydrogen atom, and R'' is an unsaturated aliphatic group having up to eight carbon atoms when R' is an alkyl group having from one to four carbon atoms.

2. A copolymer according to claim 1 in which said acrylic-type monomer is an alkyl acrylate having from one to four carbon atoms in its alkyl group.

3. A copolymer according to claim 1 wherein said acrylic type monomer is ethyl acrylate.

4. A copolymer as claimed in claim 3 wherein said saturated epoxy compound is selected from the class consisting of ethylene oxide, epichlorohydrin and propylene oxide.

5. A process for copolymerizing a monomeric mixture consisting of (a) at least one saturated epoxy monomer having the formula $$MCH\underset{O}{\diagdown\diagup}CH_2$$

in which M is selected from the class consisting of a hydrogen atom, unsubstituted alkyl groups having from one to eight carbon atoms, halogenated alkyl groups having from one to eight carbon atoms, unsubstituted aryl groups and halogenated aryl groups, and (b) at least one acrylic-type monomer having the general formula RCH=CR'COOR'' in which R and R' are each selected from the class consisting of a hydrogen atom and alkyl groups having from one to four carbon atoms, and R'' is an aliphatic group having from one to eight carbon atoms, which comprises effecting the copolymerization in the presence of a catalyst system comprising an organometallic compound of a metal selected from Groups II and III of the Periodic Classification of the Elements, said organometallic compound having at least one organic radical linked to the metal atom through a carbon atom.

6. A process according to claim 5 wherein said acrylic-type monomer is an alkyl acrylate having from one to four carbon atoms in its alkyl group.

7. A process according to claim 6 wherein said alkyl acrylate is ethyl acrylate.

8. A process according to claim 6 wherein said organo- metallic compound is selected from aluminum and zinc alkyls.

9. A process according to claim 6 wherein the catalyst system comprises a cocatalyst selected from water and alcohols and an organometallic compound selected from the class consisting of aluminum alkyls and zinc alkyls, the amount of cocatalyst being such that the total number of active hydrogen atoms in the cocatalyst is less than the total number of alkyl groups linked to the metal atoms in the organo-metallic compound.

10. A process for copolymerizing a monomeric mixture comprising (a) at least one saturated epoxy monomer having the formula:

$$MCH\underset{O}{\diagdown\diagup}CH_2$$

in which M is selected from the class consisting of a hydrogen atom, unsubstituted alkyl groups having from one to eight carbon atoms, halogenated alkyl groups having from one to eight carbon atoms, unsubstituted aryl groups, and halogenated aryl groups, and (b) an alkyl acrylate having from one to four carbon atoms in its alkyl group, which comprises effecting the copolymerization in the presence of a catalyst system comprises a cocatalyst selected from water and alcohols and an organometallic compound selected from the class consisting of aluminum alkyls and zinc alkyls, the amount of cocatalyst being such that the total number of active hydrogen atoms in the cocatalyst is less than the total number of alkyl groups linked to the metal atoms in the organometallic compound.

11. A process according to claim 10 wherein said alkyl acrylate is ethyl acrylate.

12. A process according to claim 10 wherein said saturated epoxy monomer is selected from the class consisting of ethylene oxide, propylene oxide and epichlorohydrin.

13. A process according to claim 10 wherein said alkyl acrylate is ethyl acrylate and said saturated epoxy monomer is selected from the class consisting of ethylene oxide, propylene oxide and epichlorohydrin.

14. A process for copolymerizing ethyl acryate and ethylene oxide which comprises effecting the copolymerization in the presence of a catalyst system comprising an organo-metallic compound and a proton-donating cocatalyst, said catalyst system being selected from (a) an aluminum trialkyl and water, (b) an aluminum trialkyl and polyvinyl alcohol, (c) an aluminum trialkyl, a zinc dialkyl and water, (d) an aluminum trialkyl, a zinc dialkyl and ethyl alcohol, (e) an alkyl aluminum halide and water, and (f) an alkyl aluminum halide, a zinc dialkyl and water, each alkyl group containing from one to four carbon atoms and the amount of cocatalyst in the catalyst system being such that the total number of active hydrogen atoms is less than the total number of alkyl groups attached to the aluminum and zinc atoms in the catalyst.

15. A process according to claim 14 in which the copolymerization is carried out in the presence of an inert liquid medium.

16. A process according to claim 15 in which the copolymerization is carried out in the presence of a liquid hydrocarbon selected from aromatic and chlorinated hydrocarbons.

17. A vulcanized product obtained by the vulcanization using a metal oxide-amine vulcanization system of a copolymer obtained by copolymerizing a monomeric mixture consisting of (a) at least one saturated epoxy compound having the formula $$MCH\underset{O}{\diagdown\diagup}CH_2$$

in which M is selected from the class consisting of a hydrogen atom, unsubstituted alkyl groups having from one to eight carbon atoms, halogenated alkyl groups having from one to eight carbon atoms, unsubstituted aryl groups and halogenated aryl groups, and (b) at least one acrylic-type monomer corresponding to the formula RCH=CR'COOR" in which R and R' are each selected from the class consisting of a hydrogen atom and alkyl groups having from one to four carbon atoms and R" is an aliphatic group containing from one to eight carbon atoms.

18. A vulcanized product obtained by the vulcanization using a zinc oxide amine vulcanization system of a copolymer obtained by copolymerizing a monomeric mixture consisting of ethyl acrylate and epichlorohydrin.

19. A vulcanized product obtained by the vulcanization using a zinc oxide amine vulcanization system of a copolymer obtained by copolymerizing a monomeric mixture consisting of ethyl acrylate and ethylene oxide.

References Cited

UNITED STATES PATENTS

| | | | |
|---|---|---|---|
| 3,103,503 | 9/1963 | Fox et al. | 260—89.5 |
| 3,110,695 | 11/1963 | Ceresa | 260—89.5 |
| 3,225,120 | 12/1965 | Baker | 260—89.5 |

HARRY WONG, JR., *Primary Examiner.*

U.S. Cl. X.R.

260—89.3, 88.5, 884, 86.1, 41, 32.8, 29.6, 80.81